(12) United States Patent
Hu

(10) Patent No.: US 6,282,244 B1
(45) Date of Patent: Aug. 28, 2001

(54) APPARATUS AND METHOD FOR DECODING COMPRESSED DIGITAL VIDEO DATA

(75) Inventor: Yi-Kwang Hu, Hsin Chu (TW)

(73) Assignee: United Microelectronics Corp., Hsinchu (TW)

(*) Notice: Subject to any disclaimer, the term of this patent is extended or adjusted under 35 U.S.C. 154(b) by 0 days.

(21) Appl. No.: 08/699,929

(22) Filed: Aug. 20, 1996

(30) Foreign Application Priority Data

Apr. 20, 1996 (TW) .................................................. 85104740

(51) Int. Cl.⁷ .................................................... H04B 1/66
(52) U.S. Cl. ........................................................ 375/240.2
(58) Field of Search ................................... 348/409, 405, 348/395, 417, 404, 408, 415, 407, 426, 403, 523, 524; 382/233, 234, 248, 250; 358/432, 433; 375/240, 240.18, 240.2

(56) References Cited

U.S. PATENT DOCUMENTS

| | | | |
|---|---|---|---|
| 5,402,244 | * 3/1995 | Kim ..................................... | 348/405 |
| 5,502,493 | * 3/1996 | Meyer ................................. | 348/426 |
| 5,576,765 | * 11/1996 | Cheney et al. ..................... | 348/407 |
| 5,623,311 | * 4/1997 | Phillips et al. ..................... | 348/396 |
| 5,649,029 | * 7/1997 | Galbi ................................... | 382/233 |
| 5,694,172 | * 12/1997 | Miyano ............................... | 348/415 |
| 5,710,598 | * 1/1998 | Ukai et al. .......................... | 348/408 |
| 5,768,561 | * 6/1998 | Wise ................................... | 395/500 |
| 5,832,128 | * 11/1998 | Suzuki ................................ | 382/248 |
| 5,867,601 | * 2/1999 | Phillips ............................... | 382/250 |

OTHER PUBLICATIONS

*IEEE Transactions on Circuits and Systems for Video Technology*, "An Entropy Coding System for Digital HDTV Applications", vol. 1, No. Mar. 1991.

* cited by examiner

Primary Examiner—Chris Kelley
Assistant Examiner—Grims Philippe
(74) Attorney, Agent, or Firm—Rabin & Berdo, P.C.

(57) ABSTRACT

An apparatus and method for decoding compressed digital video data which has been compressed, for example in a format compliant with the Motion Picture Experts Group I (MPEG) standard or the Joint Picture Experts Group (JPEG) standard. The apparatus and method allows a fast decoding rate for the compressed digital video data. A variable length decoding (VLD) circuit is used to generate a first bit sequence of a fixed length by decoding the received compressed digital video data. Then, an inverse quantizer is used to convert the first bit sequence by inverse quantization into a second bit sequence. A zig-zag buffer is then used to store the second bit sequence at specific locations and output a plurality of frequency-division binary signal bits concurrently in parallel. An inverse discrete cosine transfer (IDCT) circuit is used to process the plurality of frequency-division binary signal bits according to an inverse discrete cosine transfer function, to generate a plurality of time-division binary signal bits. These signal bits are combined into a time-division serial binary signal representative of decoded data for the compressed digital video data.

11 Claims, 4 Drawing Sheets

APPARATUS AND METHOD FOR DECODING COMPRESSED DIGITAL VIDEO DATA

BACKGROUND OF THE INVENTION

1. Field of the Invention

The invention relates to the decoding of compressed digital data, and more particularly, to an apparatus and method for decoding compressed digital video data that has been compressed, for example, in a format compliant with the MPEG (Motion Picture Experts Group I) standard or the JPEG (Joint Picture Experts Group) standard.

2. Description of the Related Art

Compact discs are high capacity data storage means that are widely used to supply multimedia applications including audios and videos. When converted into digital form, videos usually result in quite an enormous amount of bits and bytes, thus requiring quite a large space to store. To cope with this problem, a variety of compression methods are available for compressing the digital video data before actually storing them on compact discs. When in use, the compressed data has to be decoded (decompressed) before it can be actually processed for practical applications. The decoding process has to be fast for interactive applications. Current video decoding methods are fast, but are still not fast enough for real interactive applications.

FIG. 1 through FIG. 3 are block diagrams depicting a conventional apparatus for decoding compressed, for example, digital video data that has been compressed in a format specifically in compliance with the MPEG (Motion Picture Experts Group I) standard or the JPEG (Joint Picture Experts Group) standard. As shown in FIG. 1, the conventional apparatus comprises a variable length decoding (VLD) circuit 10, a zig-zag buffer 20, an inverse quantizer 30, and an inverse discrete cosine transfer (IDCT) circuit 40.

The VLD circuit 10 receives a bit stream of compressed digital video data via an input data line 11 and then compares the compressed digital video data with values prestored in a parameter table 13 so as to generate a first bit sequence of a fixed length which is sent via the data line 21 to the zig-zag buffer 20.

The zig-zag buffer 20 receives the first bit sequence from the data line 21 and stores the first bit sequence in a zig-zag manner, so as to generate a second bit sequence which is sent via the data line 31 to the inverse quantizer 30.

The inverse quantizer 30 receives the second bit sequence from the data line 31 and converts the second bit sequence by a conventional inverse quantization method into a frequency-division binary signal which is sent via the data line 41 to the IDCT circuit 40.

The IDCT circuit 40 receives the frequency-division binary signal from the data line 41 and converts the frequency-division binary signal by an inverse discrete cosine transfer function into a time-division binary signal representative of the decoded data. This completes the process of decoding of the compressed data.

Referring further to FIG. 2, there is shown a block diagram of the circuit structure of the zig-zag buffer 20, which includes a write-in address generator 26, a multi-port random accesss memory (RAM) unit 27, and a read-out address generator 28. When the first bit sequence from the VLD circuit 10 is received by the zig-zag buffer 20, the write-in address generator 26 generates a read-in address signal and sends it via the address bus 22 to the RAM 27 so as to store the received data in corresponding addresses in the RAM 27. The read-in address signal is devised in such a way that the received data is stored in a predetermined zig-zag manner in the RAM 27. After that, the read-out address generator 28 generates a read-out address signal and sends it via the address bus 23 to the RAM 27 so as to fetch data in corresponding addresses. The data thus fetched from the RAM 27 is output via the data line 31 and will be referred to as the second bit sequence hereinafter.

Referring further to FIG. 3, there is shown a block diagram of the IDCT circuit 40 which includes a serial-to-parallel converter 45 and an IDCT core unit 46. When the frequency-division binary signal from the inverse quantizer 30 is received by the IDCT circuit 40 via the data line 41, the received data is converted from serial to parallel and then sent via the data bus 42 to the IDCT core unit 46. The parallel data is then processed by the IDCT core unit 46 according to an inverse discrete cosine transfer function into a plurality of time-division binary signal bits which, after being converted to serial form, represent a bit stream of the decoded data and is output via the data line 51.

In the above described conventional apparatus, the compressed digital video data on the data line 11 and the first bit sequence on the data line 21 are in compressed form, whereas the second bit sequence on the data line 31, the frequency-division binary signal on the data line 41, and the time-division binary signal on the data line 51 are in a decoded form and are transmitted at pixel rates. Since compressed data is significantly less in volume than the original data, for example, with a compression ratio typically at 1:10 by the MPEG I standard, a processing lag will occur between the input end and the output end of the conventional apparatus of FIG. 1. In the zig-zag buffer 20, since the write-in address generator 26 and the read-out address generator 28 perform the data read-out operation in a serial manner so that the data has to be converted by the serial-to-parallel converter 45 into parallel form before being sent to the IDCT core unit 46, the data flow there is somewhat slower than the IDCT core unit 46 can handle. Thus, the serial read-out operation in the zig-zag buffer 20, and the need for the serial-to-parallel converter 45 to convert the serial binary signal into parallel form, cause a delay in the decoding process. This delay affects significantly the performance of the process of decoding the compressed video data. There exists therefore a need for a new decoding apparatus and method which can enhance the performance of the decoding process by eliminating the serial-to-parallel conversion performed in the conventional apparatus.

SUMMARY OF THE INVENTION

It is therefore an object of the invention to provide an apparatus and method for decoding compressed digital video signals, which can enhance the performance of the decoding process by eliminating the serial-to-parallel conversion performed in the conventional apparatus.

In accordance with the foregoing and other objects of the invention, a new and improved apparatus and method for decoding compressed digital video signals are provided. The apparatus includes a VLD circuit for generating a first bit sequence of a fixed length by decoding the received compressed digital video data. An inverse quantizer is subsequently used to convert the first bit sequence by an inverse quantization method, into a second bit sequence. A zig-zag buffer is then used to store the received second bit sequence in specific locations and output a plurality of frequency-division binary signal bits concurrently in parallel. Finally, an IDCT circuit is used to process the plurality of frequency-division binary signal bits by an inverse discrete cosine transfer function to accordingly generate a plurality of time-division binary signal bits which are combined into a time-division serial binary signal representative of decoded data for the compressed digital video data.

The method according to the invention includes generating a first bit sequence of a fixed length by decoding the compressed digital video data. The first bit sequence is converted by an inverse quantization procedure into a second bit sequence. The second bit sequence is then stored in a specific format. Accordingly, a plurality of frequency-division binary signal bits are output concurrently in parallel. The output frequency-division binary signal bits are processed according to an inverse discrete cosine transfer function so as to generate a plurality of time-division binary signal bits. These signal bits are combined into a time-division serial binary signal representative of decoded data for the compressed digital video data.

BRIEF DESCRIPTION OF DRAWINGS

The invention will be more fully understood from the following detailed description of the preferred embodiment, with reference to the accompanying drawings, wherein.

DETAILED DESCRIPTION OF PREFERRED EMBODIMENT

Figure 4:
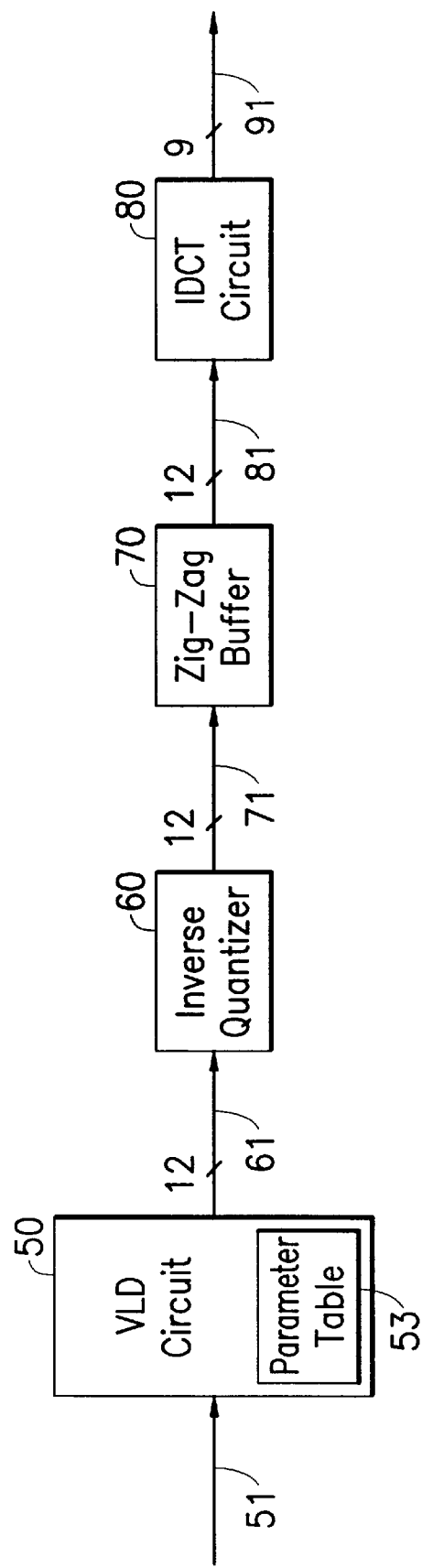
FIG. 4 is a block diagram of an apparatus according to the invention for decoding compressed digital video data.

Referring to FIG. 4, there is shown a block diagram of an apparatus according to the invention for decoding compressed digital video data. The apparatus includes a variable length decoding (VLD) circuit 50, an inverse quantizer 60, a zig-zag buffer 70, and an inverse discrete cosine transfer (IDCT) circuit 80. It is to be noted that the block structure of the apparatus according to the invention shown here differs from that of the conventional apparatus in that the inverse quantizer 60 here is arranged preceding the zig-zag buffer 70.

The VLD circuit 50 is conventional. A suitable VLD circuit 50 is described, for example, by the inventor in An Entropy Coding System for Digital HDTV Applications, IEEE Transactions on Circuits and Systems for Video Technology, Vol. 1, No. 1, March 1991. The VLD circuit 50 receives a bit stream of compressed digital video data via an input data line 51 and then compares the compressed digital video data with values prestored in a parameter table 53, so as to thereby generate a first bit sequence of a fixed length. The first bit sequence is sent via the data line 61 to the inverse quantizer 60. The fixed length is 12 bits, for example. The data processing in the VLD circuit 50 uses conventional techniques, so that description thereof will not be detailed. The inverse quantizer 60 then receives the first bit sequence from the data line 61 and converts the first bit sequence by an inverse quantization method into a second bit sequence which is sent via the data line 71 to the zig-zag buffer 70.

The zig-zag buffer 70, upon receiving the second bit sequence from the data line 71, stores the second bit sequence in a zig-zag manner at specific addresses therein. The output of the zig-zag buffer 70, in accordance with an aspect of the invention which will be described below, is a plurality of parallel frequency-division binary signal bits sent via the parallel data lines 81 to the IDCT circuit 80.

The IDCT circuit 80, upon receiving the parallel frequency-division binary signal bits from the data lines 81, converts them by the use of an inverse discrete cosine transfer function into a plurality of time-division binary signal bits. The time-division binary signal bits are combined into a serial time-division binary signal of a fixed length of, for example, 9 bits, which represents the decoded data. This completes the decoding process.

Figure 1:
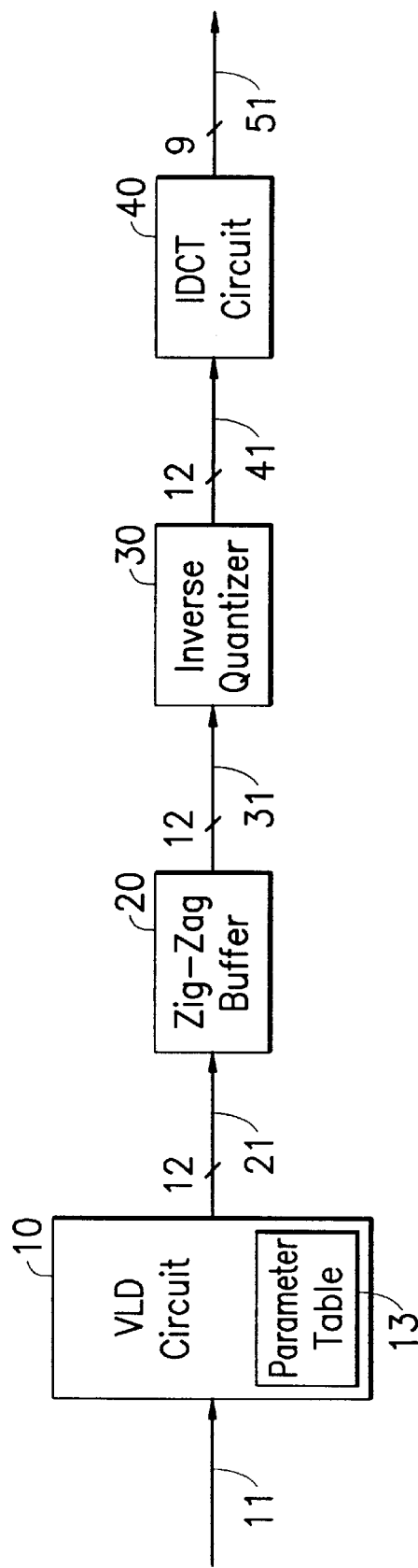
FIG. 1 is a block diagram of a conventional apparatus for decoding compressed digital video data.
Figures 2, 3:
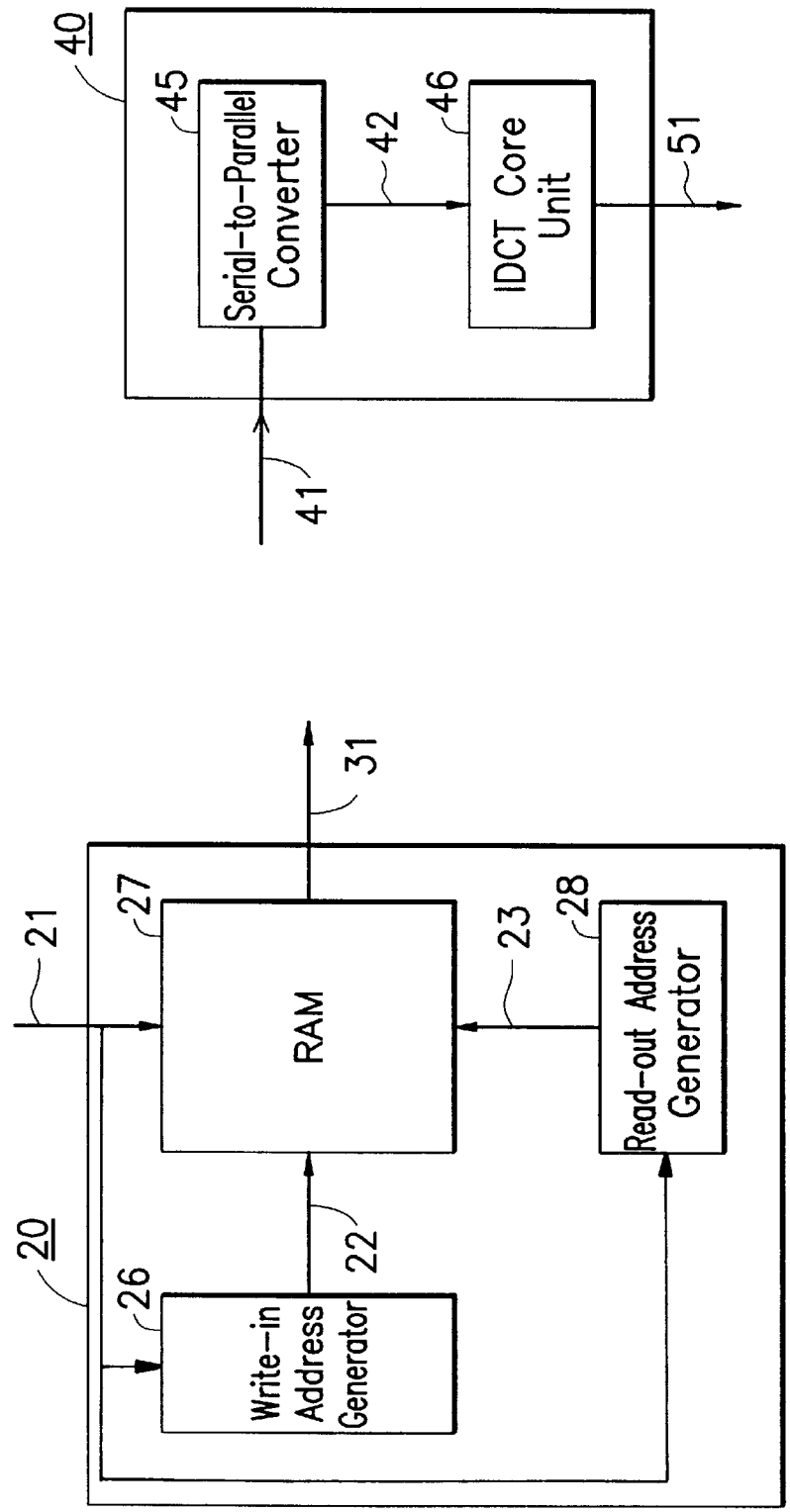
FIG. 2 is a block diagram of a zig-zag buffer employed in the conventional apparatus of FIG. 1.
FIG. 3 is a block diagram of an inverse discrete cosine transfer circuit employed in the conventional apparatus of FIG. 1.
Figure 5:
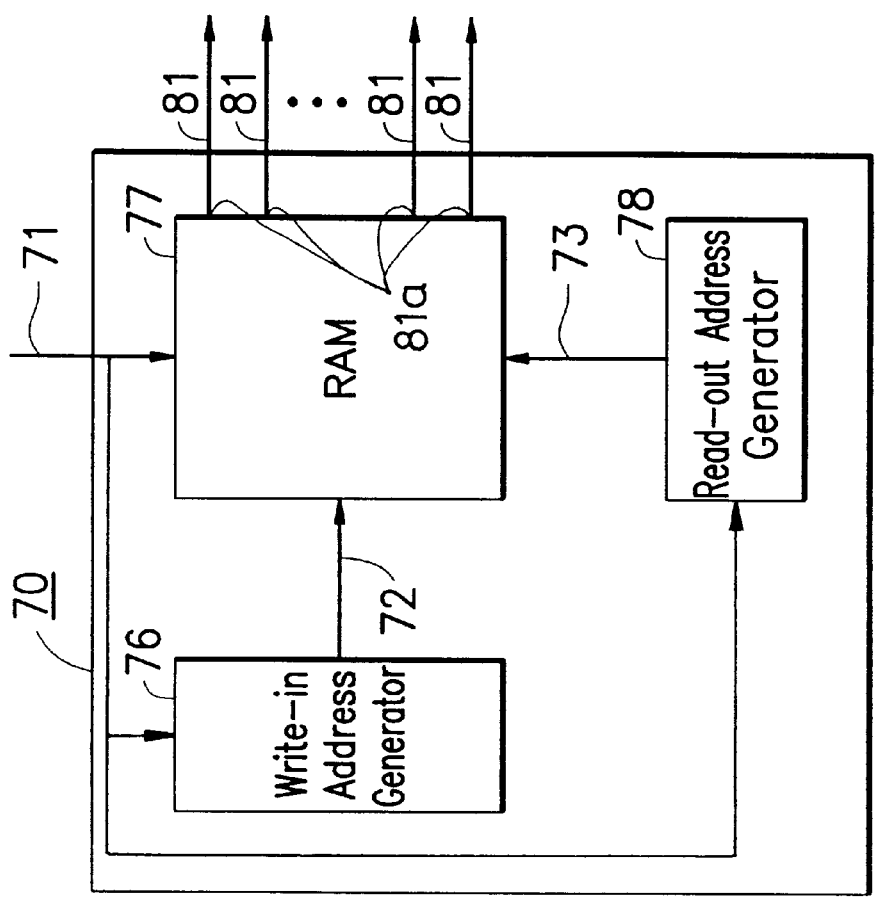
FIG. 5 is a block diagram of a zig-zag buffer employed in the apparatus of FIG. 4.

Referring to FIG. 5, there is shown a block diagram of the zig-zag buffer 70, which includes a write-in address generator 76, a multi-port RAM 77, and a read-out address generator 78. The block structure of the zig-zag buffer 70 is substantially identical to the zig-zag buffer 20 shown in FIG. 2 employed in the prior art, except that the multi-port RAM 77 here is provided with a plurality of parallel read-out ports 81a. When the zig-zag buffer 70 receives the second bit sequence from the data line 71 at the write-in address generator 76, the multi-port RAM 77, and the read-out address generator 78, the write-in address generator 76 generates a write-in address signal and sends it via the address bus 72 to the multi-port RAM 77. The RAM 77 then stores the received data therein in a zig-zag manner at specified addresses. To read out data stored in the multi-port RAM 77, the read-out address generator 78 generates a set of address signal bits 73 and sends them in parallel to the multi-port RAM 77, thereby causing a plurality of frequency-division binary signal bits to be output concurrently in parallel via the parallel read-out ports 81a.

Figure 6:
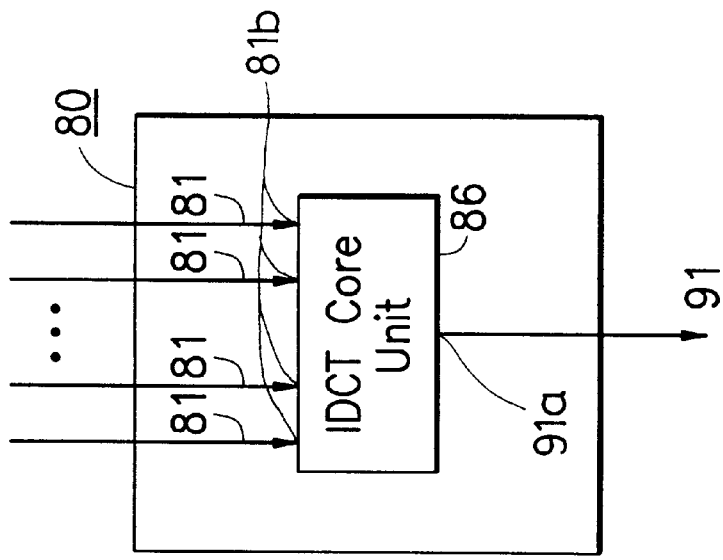
FIG. 6 is a block diagram of an inverse discrete cosine transfer circuit employed in the apparatus of FIG. 4.

Referring further to FIG. 6, there is shown a block diagram of the IDCT circuit 80. The IDCT circuit 80 includes an IDCT core unit 86 having a plurality of input ports 81b and an output port 91a. When the IDCT core unit 86 receives the plurality of parallel frequency-division binary signal bits on the parallel data lines 81, the IDCT core unit 86 processes the received data according to an inverse discrete cosine transfer function, so as to convert the received data into a plurality of time-division binary signal bits. These signal bits are then combined into a time-division serial binary signal and output via the data line 91.

In the above-described decoding apparatus, when the bit stream of compressed digital video data is received, it is converted by the VLD circuit 50 into a first bit sequence of a fixed length and directly processed thereby through inverse quantizing. Since the output data rate from the VLD circuit 50 is far lower than the pixel rate, the data processing rate of the inverse quantizer 60 is also far lower than the pixel rate. Taking the MPEG I standard as an example, the output data rate of the VLD circuit 50 is less than about one-tenth of the pixel rate. This not only allows a simplification in the circuit structure of the inverse quantizer 60, but also allows the tasks carried out by the VLD circuit 50 and the inverse quantizer 60 to be replaced by a CPU (central processing unit) or a DSP (digital signal processor). The performance can thus be significantly enhanced.

Another feature of the invention is the provision of the parallel read-out ports 81a for the multi-port RAM 77 in the zig-zag buffer 70, which allow a parallel transfer of the frequency-division binary signal bits concurrently to the IDCT circuit 80. When the second bit sequence is sent via the data line 71 to the zig-zag buffer 70, the write-in address generator 76 in the zig-zag buffer 70 accordingly selects specific addresses to store the received data in the multi-port RAM 77. To read out the thus stored data from the multi-port RAM 77, the read-out address generator 78 generates a column address signal, which is sent via the address bus 73 to the multi-port RAM 77, and the corresponding data is sent out in parallel via the parallel read-out ports 81*a*. The parallel read-out ports 81*a* on the multi-port RAM 77 and the parallel processing capability of the IDCT circuit 80, in conjunction, allow concurrent processing of a plurality of frequency-division binary signal bits. Compared to the zig-zag buffer 20 shown in FIG. 2 employed in the prior art, the zig-zag buffer 70 employed by the invention can be constructed with a simplified circuit structure and reduce the lag in data processing.

Furthermore, the IDCT circuit 80 is devised to receive the parallel frequency-division binary signal bits from the zig-zag buffer 70, and is capable of processing the received data in parallel. In the conventional apparatus, no matter whether the IDCT circuit is based on a fast algorithm architecture or a distributed arithmetic architecture, a serial-to-parallel converter has to be employed for converting a serial binary signal to parallel form. By the invention, the use of serial-to-parallel converter is eliminated, thus allowing a reduction in the delay time. The speed of the decoding process thus can be increased and the circuit structure can be reduced in complexity, which allows the decoding apparatus to provide high performance and to be manufactured at a low cost.

The invention has been described above with an exemplary preferred embodiment. However, it is to be understood that the scope of the invention is not limited to the disclosed embodiment. To the contrary, it is intended to cover various modifications and similar arrangements and the scope of the appended claims should be accorded the broadest interpretation so as to encompass all such modifications and similar arrangements.

What is claimed is:

1. An apparatus for decoding a bit stream of compressed digital video data, comprising:

(a) a variable length decoding (VLD) circuit, responsive to the compressed digital video data, for generating a first bit sequence of a fixed length by decoding the compressed digital video data;

(b) an inverse quantizer, responsive to the generated first bit sequence, for converting the first bit sequence by an inverse quantization method into a second bit sequence;

(c) a zig-zag buffer, responsive to the second bit sequence, for storing the second bit sequence at specific addresses and for generating a plurality of parallel frequency-division binary signal bits; and (d) an inverse discrete cosine transfer (IDCT) circuit, responsive to the plurality of parallel frequency-division binary signal bits, for processing the plurality of parallel frequency-division binary signal bits according to an inverse discrete cosine transfer function, to thereby generate a plurality of time-division binary signal bits, and for combining the time-division binary signal bits into a time-division serial binary signal representative of decoded data for the compressed digital video data.

2. An apparatus as claimed in claim 1, wherein said VLD circuit includes a parameter table, and wherein said VLD circuit compares the compressed digital video data with data stored in the parameter table and generates the first bit sequence based on the comparison.

3. An apparatus as claimed in claim 2, wherein the first bit sequence has a fixed length of 12 bits.

4. An apparatus as claimed in claim 1, wherein said IDCT circuit includes a plurality of input ports for receiving the plurality of parallel frequency-division binary signal bits from said zig-zag buffer.

5. An apparatus as claimed in claim 4, wherein said IDCT circuit includes an IDCT core unit for processing the plurality of parallel frequency-division binary signal bits received from said zig-zag buffer, according to the inverse discrete cosine transfer function, to generate the time-division serial binary signal.

6. An apparatus as claimed in claim 5, wherein said IDCT core unit includes:

a plurality of input ports for receiving the plurality of parallel frequency-division binary signal bits from said zig-zag buffer; and at least an output port for providing the time-division serial binary signal representative of decoded data for the compressed digital video data.

7. An apparatus as claimed in claim 1, wherein the time-division serial binary signal has a length of 9 bits.

8. A method for decoding a bit stream of compressed digital video data, comprising the steps of:

(1) generating a first bit sequence of a fixed length by decoding the compressed digital video data;

(2) performing inverse quantization to convert the first bit sequence into a second bit sequence;

(3) storing the second bit sequence in a specific format and generating accordingly a plurality of parallel frequency-division binary signal bits; and (4) processing the plurality of parallel frequency-division binary signal bits according to an inverse discrete cosine transfer function to thereby generate a plurality of time-division binary signal bits, and combining the time-division binary signal bits into a time-division serial binary signal representative of decoded data for the compressed digital video data.

9. A method as claimed in claim 8, wherein in said step (1), the compressed digital video data is compared with parameter table data, and the first bit sequence is generated based on the comparison.

10. A method as claimed in claim 8, wherein in said step (2), the second bit sequence converted by inverse quantization from the first bit sequence has a fixed bit length with a varying value.

11. A method as claimed in claim 8, wherein in said step (3), the second bit sequence is stored in a zig-zag manner.

* * * * *